United States Patent
Määttä et al.

(10) Patent No.: US 12,416,284 B2
(45) Date of Patent: Sep. 16, 2025

(54) MEASUREMENT ARRANGEMENT FOR HYDRO TURBINE

(71) Applicant: TMV Detections Oy, Vantaa (FI)

(72) Inventors: Jarkko Määttä, Kajaani (FI); Pauli Harila, Kemi (FI)

(73) Assignee: TMV DETECTIONS OY, Vantaa (FI)

( * ) Notice: Subject to any disclaimer, the term of this patent is extended or adjusted under 35 U.S.C. 154(b) by 0 days.

(21) Appl. No.: 18/975,501

(22) Filed: Dec. 10, 2024

(65) Prior Publication Data
US 2025/0179984 A1 Jun. 5, 2025

Related U.S. Application Data

(63) Continuation of application No. 18/022,890, filed as application No. PCT/FI2021/050585 on Aug. 30, 2021, now Pat. No. 12,196,169.

(30) Foreign Application Priority Data

Aug. 31, 2020 (FI) ..................... 20205842

(51) Int. Cl.
*F03B 11/00* (2006.01)
*F03B 11/04* (2006.01)
*F03B 15/16* (2006.01)

(52) U.S. Cl.
CPC ............ *F03B 11/008* (2013.01); *F03B 11/04* (2013.01); *F03B 15/16* (2013.01); *F05B 2220/32* (2013.01); *F05B 2270/1095* (2013.01)

(58) Field of Classification Search
CPC ........ F03B 11/008; F03B 11/04; F03B 15/06; F03B 15/16; F05B 2270/807; F05B 2270/1095
See application file for complete search history.

(56) References Cited

U.S. PATENT DOCUMENTS

| 4,674,279 A | 6/1987 | Ali et al. |
| 5,235,524 A | 8/1993 | Barkhoudarian |

(Continued)

FOREIGN PATENT DOCUMENTS

| CN | 102620807 | 8/2012 |
| CN | 203629869 | 6/2014 |

(Continued)

OTHER PUBLICATIONS

Lahdelma et al., "Detection of Cavitation in Kaplan Water Turbines", uploaded onto www.researchgate.net on Apr. 6, 2015 (Year: 2015).*

(Continued)

*Primary Examiner* — Danielle M. Christensen
(74) *Attorney, Agent, or Firm* — Nixon & Vanderhye PC

(57) ABSTRACT

A hydro turbine of a hydroelectric power plant operates with reduced cavitation. At least one motion sensor coupled to a rotor of the hydro turbine measures motion of the rotor during operation of the hydro turbine and generates measurement data. The measurement data and one or more operational parameters of the hydro turbine employed during the measuring are acquired. The operational parameter(s) is/are indicative of power supply of the hydro turbine. Based on the measurement data and the operational parameters, at least one metric indicative of an effect of the cavitation on the hydro turbine is computed. The at least one metric is compared with at least one threshold. Based on the comparison, a determination is made that the effect of the cavitation is too high. Based on the determining, information indicating unsuitability of the one or more operational parameters is output.

16 Claims, 4 Drawing Sheets

(56) References Cited

U.S. PATENT DOCUMENTS

| | | | |
|---|---|---|---|
| 5,754,446 | A | 5/1998 | Fisher |
| 5,772,403 | A | 6/1998 | Allison |
| 6,152,684 | A | 11/2000 | Ferme et al. |
| 7,539,549 | B1 | 5/2009 | Discenzo et al. |
| 11,149,533 | B1 | 10/2021 | Yeung |

FOREIGN PATENT DOCUMENTS

| | | |
|---|---|---|
| CN | 109342018 | 2/2019 |
| CN | 110954601 | 4/2020 |
| CN | 111220702 | 6/2020 |
| EP | 0825344 | 2/1998 |
| EP | 3250918 | 3/2018 |
| EP | 1816347 | 6/2018 |
| EP | 3355043 | 8/2018 |
| FR | 2964164 | 3/2012 |
| JP | 2016-017418 | 2/2016 |
| WO | 2022/043616 | 3/2022 |

OTHER PUBLICATIONS

Search Report, Finland Application No. 20205842, Mar. 25, 2021, 2 pages.

P. Bourdon et al., "Erosion Vibratory Fingerprint of Leading Edge Cavitation of a NACA Profile and of a Francis Model and Prototype Hyrdroturbine", Bubble Noise and Cavitation Erosion in Fluid Systems, 1993, pp. 51-67.

X. Escaler et al., "Vibration Cavitation Detection Using Onboard Measurements", Fifth International Symposium on Cavitation, 2003, pp. 1-7.

K. Yamamoto et al., "Experimental Evidence of Inter-blade Cavitation Vortex Development in Francis Turbines at Deep Part Load Condition", Exp Fluids, 2017, pp. 1-14.

D. Valentin et al., "Detection of Hydraulic Phenomena in Francis Turbines with Different Sensors", Sensors, 2019, pp. 1-25.

M Skinner et al., "Evaluation of Techniques for Detection of Cavitation on the Runner of a Model Hydraulic Turbine", US Department of the Interior, 1991, 77 pages.

G. Demirel et al., "Experimental Determination of Cavitation Characteristics of Hydraulic Turbines", Proceedings of the World Congress on Engineering, 2015, 5 pages.

P. Guy et al. Monitoring By Integrated Piezo Sensors of a Turbine Blade Submitted to Caviation, e-Forum Acusticum, Dec. 2020, Lyon France, pp. 63-66, Hal-03240266.

International Search Report and Written Opinion, European Patent Office, PCT Application No. PCT/FI2021/050585, Nov. 3, 2021 (13 pages).

\* cited by examiner

MEASUREMENT ARRANGEMENT FOR HYDRO TURBINE

CROSS-REFERENCE TO RELATED APPLICATIONS

This application is a continuation of U.S. application Ser. No. 18/022,890 filed Feb. 23, 2023, which is the U.S. National Phase of PCT/FI2021/050585 filed Aug. 30, 2021, which claims the benefit of FI 20205842 filed on Aug. 31, 2020, the entire contents of which are hereby incorporated herein by reference.

TECHNICAL FIELD

The present invention relates to a field of power generation in a hydro plant and, particularly, measurements related to using a hydro turbine for balancing power supply in a power grid.

TECHNICAL BACKGROUND

A hydro plant generates electric power from liquid, e.g. water, arranged to flow through a hydro (water) turbine. The hydro turbine is a rotary machine that converts kinetic energy and potential energy of water into mechanical work which in turn is converted to electricity in the hydro plant. Water turbines were developed in the 19th century and are mostly used for electric power generation.

Now and particularly in the future, renewable energy sources such as wind power and solar power will gain a greater portion of the total power supply. As they are seasonal and somewhat unpredictable power sources, supplementing power sources are required to balance the power supply and to provide a fast response to changing in power demand. As known in the art, the aim is to keep the power supply as close to the power demand of the power grid as possible. Therefore, it is important to provide a fast response to the changes in the power supply and the power demand. The role of the hydro plants in this is rising but it also raises challenges. One challenge is the constant requirement to control the output of the hydro turbine(s) and utilization of also low output power regions.

Conventionally when the hydro plant functions as a main power source, when a demand drops below a certain threshold a hydro generator is shut down. As a consequence, lower power output regions become unused. However, when the hydro plant is used for dynamic power supply balancing as an auxiliary power source, also the lower power output regions become a factor.

Cavitation is a characteristic that affects the operation of the hydro generators. Cavitation is formation of vapor bubbles in the liquid flowing through the hydro turbine. Cavitation typically occurs close to rotor blades of the turbine. Cavitation occurs when the pressure of the liquid falls below its vapor pressure, and vapor bubbles are formed. Collapse of these bubbles generates pressure waves, causing damage to machinery such as the rotor.

BRIEF DESCRIPTION

The present invention is defined by the subject matter of the independent claims.

Embodiments are defined in the dependent claims.

BRIEF DESCRIPTION OF THE DRAWINGS

In the following the invention will be described in greater detail by means of preferred embodiments with reference to the accompanying drawings, in which.

DETAILED DESCRIPTION OF EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As described in Background, cavitation degrades the operation of hydro turbines and, in general, any turbomachines. A turbomachine is defined in mechanical engineering as a machine that transfers energy between a rotor and fluid, e.g. water. The turbomachine encompasses both turbines and compressors. While a turbine transfers energy from the fluid to the rotor, a compressor transfers energy from the rotor to the fluid. Although the embodiments described below focus on the turbines, in particular hydro/water turbines, similar principles apply to compressors such as water pumps and propellers/rotors of naval vessels.

Figure 1:
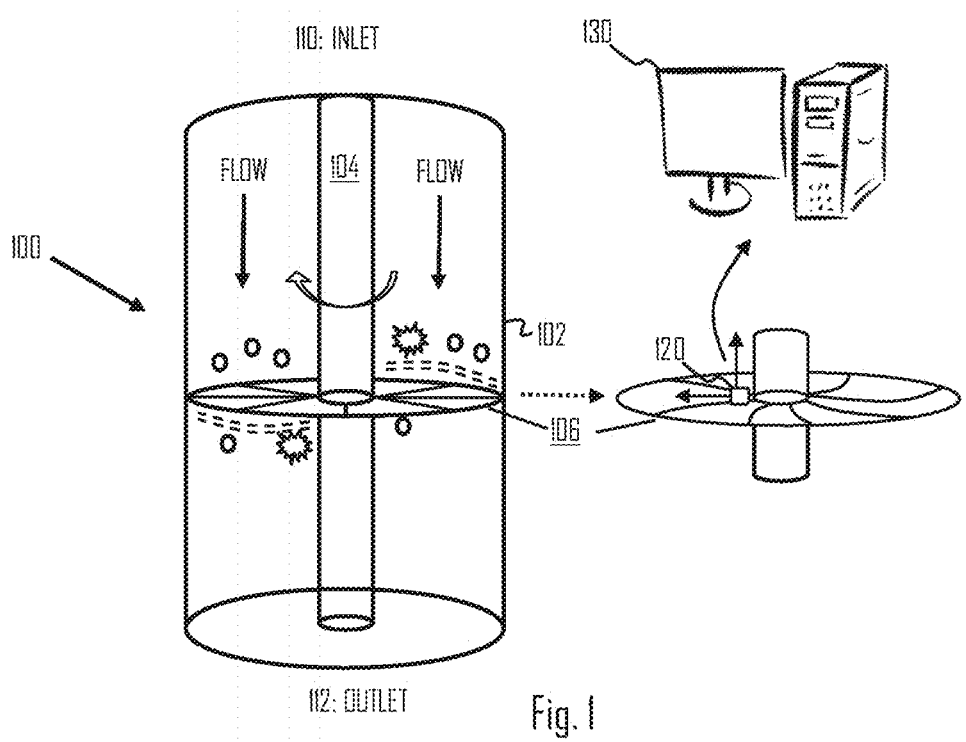
FIG. 1 illustrates a hydro turbine, cavitation, and a measurement system according to an embodiment of the invention.

FIG. 1 illustrates a simplified hydro turbine (e.g. a water turbine) 100 in operation. Water (liquid) is fed into the turbine 100 from the inlet 110 at an elevated position, and the water flows through the turbine and exits from an outlet 112 at a lower position. The flow of water through a rotor 106 causes the rotor 106 to spin around its axis, thus rotating a shaft 104 fixed to the rotor. The mechanical rotation of the shaft can then be transformed into electricity, and the description of that is left out for the sake of conciseness. The rotor may include rotor blades guiding the water and controlling how the flow is transformed into the mechanical rotation. A pitch angle of the rotor blades may be controllable. The turbine may further include a stator 102 which is a stationary part of the turbine and houses the rotor, the inlet and the outlet. The water flows through the stator 102. The stator may also include blades to guide the flow of the water, and pitch angles of the stator blades may also be controllable.

As described in Background, the flow of water through the turbine and resulting mechanical motion induces cavity into the turbine. The cavity causes vibration of the rotor and potentially other components of the turbine, as illustrated by the small explosions and resulting rotor vibration in FIG. 1. The cavity damages the components and degrades efficiency of the turbine. Therefore, it is desirable to find operational parameters for the turbine such that the effect of cavitation is reduced. It has been recognized that the cavitation increases in higher power output regions and when the turbine is powered-up. It has also been recognized that cavitation is lower at lower power output regions. However, the inventor has recognized that the cavitation effect is rarely linear or predictable, and the cavitation may suddenly increase in the lower power output regions as well. The degree of cavitation is not necessarily static even when the operational parameters and the power output of the turbine remain constant.

The right-hand side of FIG. 1 illustrates a measurement system for measuring motion of the rotor 106. The measurement system includes one or more motion sensors 120 coupled with the rotor 106 and configured to measure radial and/or axial motion of the rotor. The axial motion is motion along the shaft 104 while the radial motion is motion in the direction between a centre and an edge of a rotor disc. The motion sensor(s) may include one or more accelerometers but, in principle, other motion sensors could be employed. The motion sensor(s) is/are connected to a computer system 130 and configured to output motion measurement data to the computer system 130 for processing. The computer system may then analyse the motion measurement data and output results of the analysis, as described in embodiments below.

Figure 2:
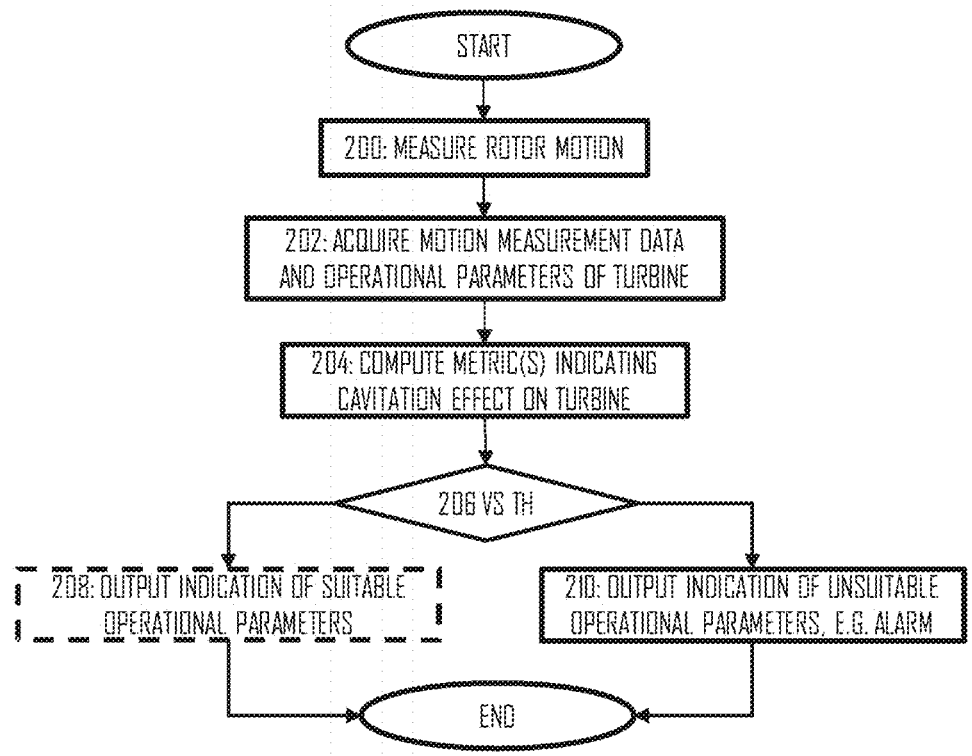
FIG. 2 illustrates a flow diagram of a procedure for analyzing effects of cavitation according to an embodiment.

FIG. 2 illustrates an embodiment of a method for analysing cavitation in a hydro turbine of a hydroelectric power plant, the method comprising: measuring (block 200), by using at least one motion sensor coupled to a rotor of the hydro turbine, motion of the rotor during operation of the hydro turbine and thereby generating measurement data; acquiring (block 202), by at least one processor, the measurement data and one or more operational parameters of the hydro turbine employed during said measuring, the one or more operational parameters indicative of power supply of the hydro turbine; computing (block 204), by the at least one processor on the basis of the measurement data and the operational parameters, at least one metric indicative of an effect of the cavitation on the hydro turbine; comparing (block 206), by the at least one processor, the at least one metric with at least one threshold and determining, on the basis of the comparison, that the effect of the cavitation is too high; and outputting (block 210), by the at least one processor on the basis of said determining, information indicating unsuitability of the one or more operational parameters.

The embodiment of FIG. 2 enables detection of suitable operational power ranges that define the power output of the turbine in such manner that the cavitation effect can be reduced. This improves the efficiency of the turbine and reduces damages caused by the cavitation. It also helps in avoiding unnecessary shutdowns and associated start-ups of the turbine that result in inefficiency and may deteriorate the turbine. The embodiments may also be used when developing the turbines to design the turbines in such manner that the effects of the cavitation are reduced.

The at least one motion sensor may be attached directly to the rotor or it may be mechanically coupled to the rotor via a structure such as a bearing of the rotor. Any coupling enabling measurement of the motion of the rotor may be suitable.

In an embodiment, upon determining in the comparison in block 206 that the cavitation effect is sufficiently low, the at least one processor may output no indication or output an indication that the operational parameters are suitable for the operation of the turbine (block 208).

The at least one processor may be comprised in the computer system 130 of FIG. 1. The computer system may be a local computer such as a personal computer or a laptop but, in other embodiments, the computer system may comprise a server computer or a cloud computing system connected to the motion sensor(s) via one or more computer networks, e.g. the Internet.

In an embodiment, the method of FIG. 2 is performed during normal operation where the turbine is coupled to a power output of the power plant and is generating electric power into a power grid. In such an embodiment, the measurement analysis may be used as an input to control or govern the operational parameters of the turbine. Hydro turbines are typically coupled to a governing system that controls the operational parameters and power output of the turbine. The governing system may control the flow of the water through the turbine, thus controlling the power output. The governing system may use the measurement analysis when optimizing the operational parameters to meet the power demand in such manner that the effect of the cavitation is reduced.

Figure 3:
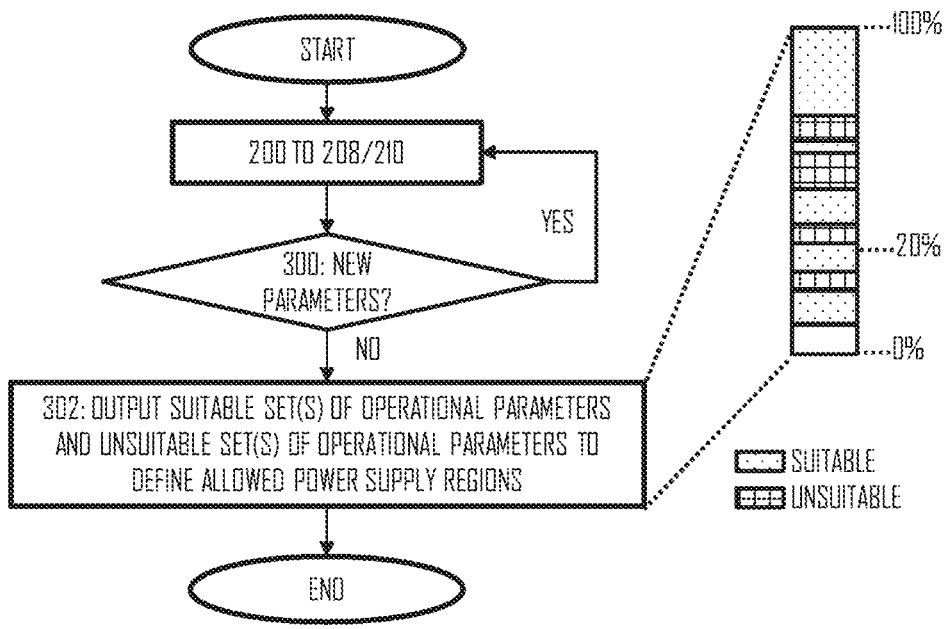
FIG. 3 illustrates an embodiment of the procedure of FIG. 2.

In an embodiment, the method of FIG. 2 is performed to find sets of suitable operational parameters or, in other words, suitable power output ranges where the turbine can operate without the adverse effects of the cavitation. In such an embodiment, the method of FIG. 2 may be performed for various sets of operational parameters defining various power output ranges of the turbine. FIG. 3 illustrates such an embodiment. The procedure of FIG. 3 may be carried out during normal operation of the turbine connected to the power grid such that the measurement data is acquired for the analysis when the turbine is run at the various power ranges and with various operational parameters. Alternatively, or additionally, the turbine may be configured to use a specific set of operational parameters for the purpose of the measurements and analysis to cover a power range that is or has not been used during normal operation of the turbine, i.e. for testing the turbine. Then, the turbine may be connected to or disconnected from the grid for the testing.

Referring to FIG. 3, blocks 200 to 206 are carried out for a first set of operational parameters defining a first power output range. When the analysis has been performed for the first set of operational parameters, the result of the analysis may be output (block 208 or 210), e.g. stored in a database. Thereafter, it is determined in block 300 whether a new measurement with a different set of operational parameters shall be executed. If yes, the blocks 200 to 208/210 are carried out for the new set of operational parameters. In such manner, the loop may be iterated for various sets of operational parameters and various power output ranges of the turbine. As a result, the procedure outputs in block 302 at least one suitable set of one or more operational parameters and at least one unsuitable set of one or more operational parameters. The right-hand side of FIG. 3 provides an exemplary illustration of the output of block 302, illustrating the whole power output range from zero to 100 percent output of the turbine. It also illustrates power output ranges deemed, on the basis of the analysis, to be susceptible to high cavitation and thus unsuitable for operation (grid pattern), and power output ranges deemed, on the basis of the analysis, to be less susceptible to high cavitation and thus suitable for operation (dotted pattern). The governing system may then use the output to limit the power output ranges of the turbine to only the suitable power output ranges with the appropriate selection of the operational parameters. Accordingly, at least some of the power output ranges (indicated by the grid pattern) may be disabled by the governing system on the basis of the output, and corresponding sets of operational parameters may also be disabled.

In an embodiment, at least some of the operational parameters configure the power supply of the turbine to a region below 20 percent of a maximum power supply of the hydro turbine. As a result, the output in block 302 may indicate for the region below the 20% of the maximum output at least one suitable power supply region and at least one unsuitable power supply region. In other terms, the output in block 302 may indicate for the region below five Mega Watts (MW) power supply output at least one suitable power supply region and at least one unsuitable power supply region. These regions may be particularly interesting when the turbine is used for power supply balancing as an auxiliary power supply. Such a lower region may be one that would be otherwise unused, e.g. when using the turbine as the main power source. However, when using the turbine for power balancing, the lower region may be taken into use and the cavitation measurements may be used to determine suitable power supply ranges at the lower power region. The region may be different for different types of turbines, e.g. for a certain turbine the region below the 20 percent may be appropriate while the region may be below 25 percent, below 15 percent, or even below 5 percent for certain other turbines. It means that the motion measurements according to the described embodiments may be carried out in such a lower power region to limit the enabled power supply ranges in the lower power region.

In an embodiment, the one or more operational parameters used as an input for the analysis in block 202 comprises at least one of the following: an output power of the hydro turbine, a flow rate of liquid through the hydro turbine, pitch angle of rotor blades, pitch angle of stator blades, an elevation between inlet and outlet of the liquid in the hydro turbine (the drop level of the water), a (hydrostatic) pressure at the turbine, a number of revolutions per time unit of the rotor, an absolute level of the water at the inlet, an absolute level of the water at the outlet, and an operational state of the hydro turbine indicating whether the hydro turbine is running, stopped, or in state transitioning. It has been observed that at least these operational parameters may affect the appearance and degree of cavitation. With respect to the operational state, it has been observed that the cavitation behaves differently in different states with the same other operational parameters. For the purpose of FIG. 3 and related determining the allowed power output ranges, only the measurements performed when the turbine is 'running' may be employed.

In an embodiment, the measurement data comprises acceleration data, and block 204 comprising computing, by the at least one processor, at least one of a first derivative, a second derivative, and a higher order derivative of the acceleration data. Block 204 may further comprise computing the at least one metric on the basis of the at least one of the first derivative, second derivative, and a higher order derivative of the acceleration data. The computing may further include the acceleration data as an input to the computation of the at least one metric. The purpose in the computation is to find metrics that indicate high vibration, e.g. vibration above the threshold(s) employed in block 206. Such metrics may be computed in spectral analysis of the acceleration data (or derivative(s) thereof) and/or in temporal analysis. Such metrics may include: peak value or an average peak value within an observation interval, a crest factor indicating a difference or a ratio between a peak value or peak values and a mean value or a root mean square value of the acceleration data (or its derivative(s)), or another metric indicating a degree of variation in the measured motion of the rotor. For example, when the average peak value is above a certain threshold, it may be determined that the degree of cavitation is too high for the operational parameters to be suitable and, as a consequence, block 210 may be executed. Similarly, if the variance or deviation is above a certain threshold, block 210 may be executed.

Figure 4:
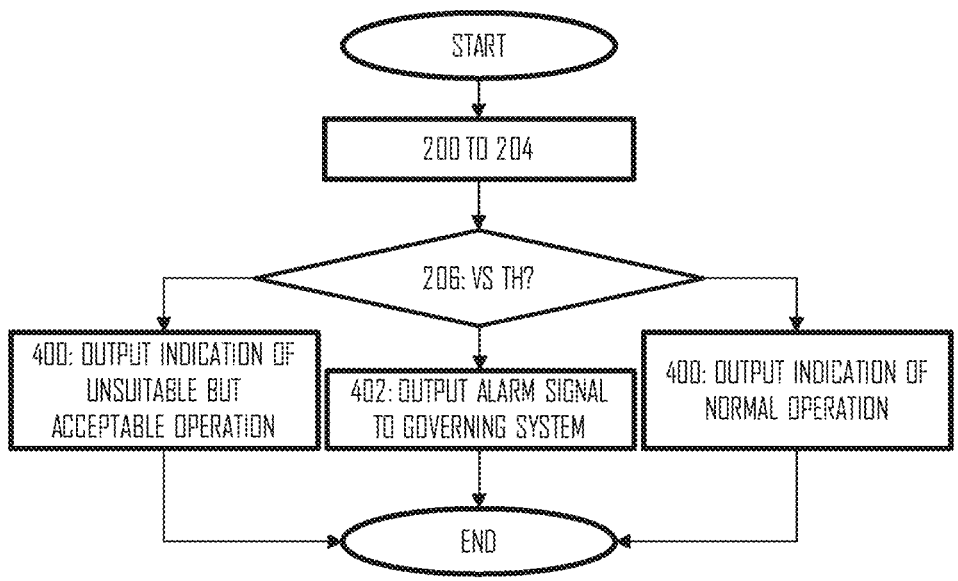
FIG. 4 illustrates a further embodiment of the procedure of FIG. 2.

In an embodiment, the information output in block 210 comprises an alarm signal. FIG. 4 illustrates a procedure according to such an embodiment. Blocks 200 to 206 may be carried out according to any one of the above-described embodiments. Block 400 may represent an embodiment of block 208 where the processor(s) outputs indication that the cavitation is within acceptable limits and that the operation is normal. Upon detecting on the basis of the comparison in block 206 that the measured vibration of the rotor is above a first threshold but below a second threshold or, in other words, within a first region, the process may proceed to block 400 where the processor(s) outputs an indication that the cavitation is high but still acceptable. This indication may be output via a user interface to an operator or the governing system to indicate increased cavitation. The operator or the governing system may then decide whether or not to change the operational parameters in an attempt to find a region where the cavitation is reduced. Upon detecting on the basis of the comparison in block 206 that the measured vibration of the rotor is above the second threshold or, in other words, within a second region greater than the first region, the process may proceed to block 402 where the processor(s) outputs the alarm signal to the governing system or to the operator. In response to the alarm signal, the governing system may trigger automated shut down the hydro turbine on the basis of the alarm signal. Alternatively, the governing system may take control of the turbine in other ways to reduce the cavitation that is deemed in the comparison to be too high for acceptable operation, e.g. to direct the operation of the turbine towards a power supply region deemed on the basis of the motion measurements to cause less cavitation to the rotor and the turbine.

Figure 5:
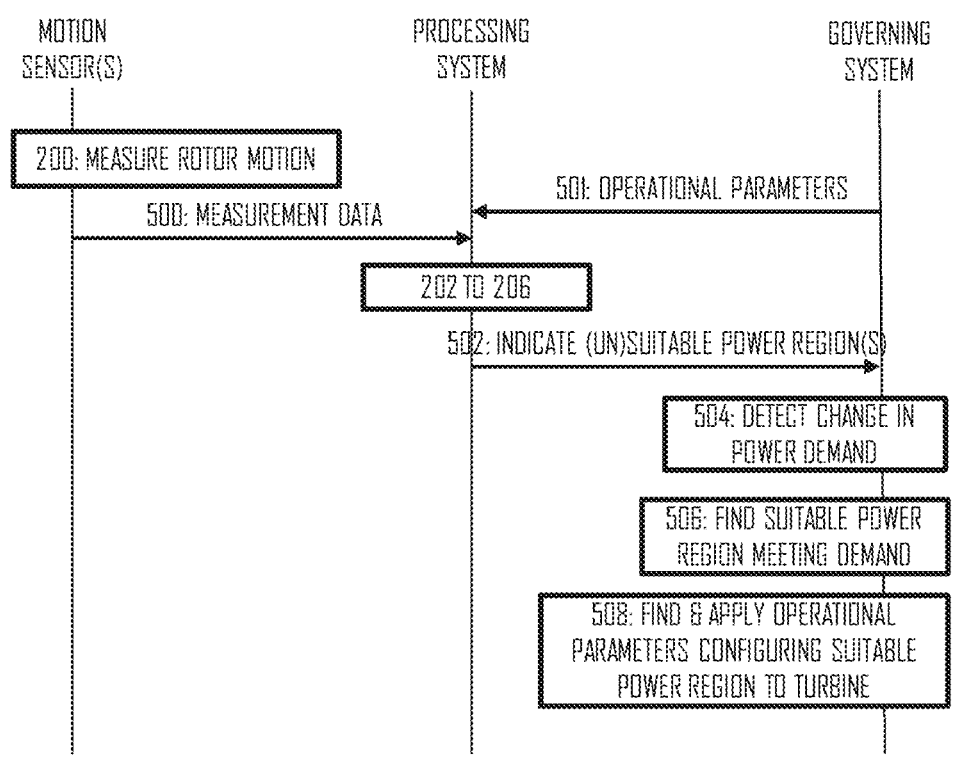
FIG. 5 illustrates a signalling diagram of cooperation between various elements for measuring and controlling the turbine.

Let us then describe the cooperation in the measurement and control system according to an embodiment with reference to a signalling diagram of FIG. 5. The motion sensor(s) perform the motion measurements, as described above in connection with block 200. The operation of the motion sensor(s) may be controlled by the processing system, e.g. the processing system may activate or enable the motion sensor(s) upon determining to start the measurements. For example, upon receiving current operational parameters from the governing system in step 501 and detecting that the measurements shall be performed for the current operational parameters, the processing system may trigger the motion sensor(s) to perform the measurements. As a result of the measurements, the motion sensor(s) output measurement data to the processing system via a wired or wireless communication method.

Upon receiving the measurement data, the processing system may perform blocks 202 to 206, i.e. determine the suitable power supply region(s). Depending on the embodiment, the processing system my either indicate to the governing system whether or not the current operational parameters (or power supply region) is suitable or the suitable and unsuitable power supply regions (step 502). Upon receiving the information in step 502, the governing system may then use the information in controlling the operational parameters of the turbine in blocks 504 to 508.

In an embodiment, the operational parameters of the hydro turbine controlled on the basis of the information comprises a pitch angle of rotor blades and/or stator blades of the hydro turbine. In another embodiment, the operational parameters controlled comprises controlling an amount of water input to the turbine at the inlet.

According to an embodiment, upon detecting a change in the power demand 504, the governing system may read the information received in step 502 and find a power control region (block 506) that meets the detected power demand and that is indicated by the information as suitable in terms of the cavitation. The governing system may control multiple turbines that together are controlled to meet the power demand. All turbines may be measured according to the above-described embodiments and, therefore, the governing system is aware of suitable power supply regions for all turbines. This brings more versatility to the control and the governing system may find a suitable power supply combination from the suitable power supply regions of the multiple turbines. Upon finding suitable power supply region(s) that meet the demand, the governing system may find the associated operational parameters and configure the turbines to apply the operational parameters (block 508).

Figure 6:
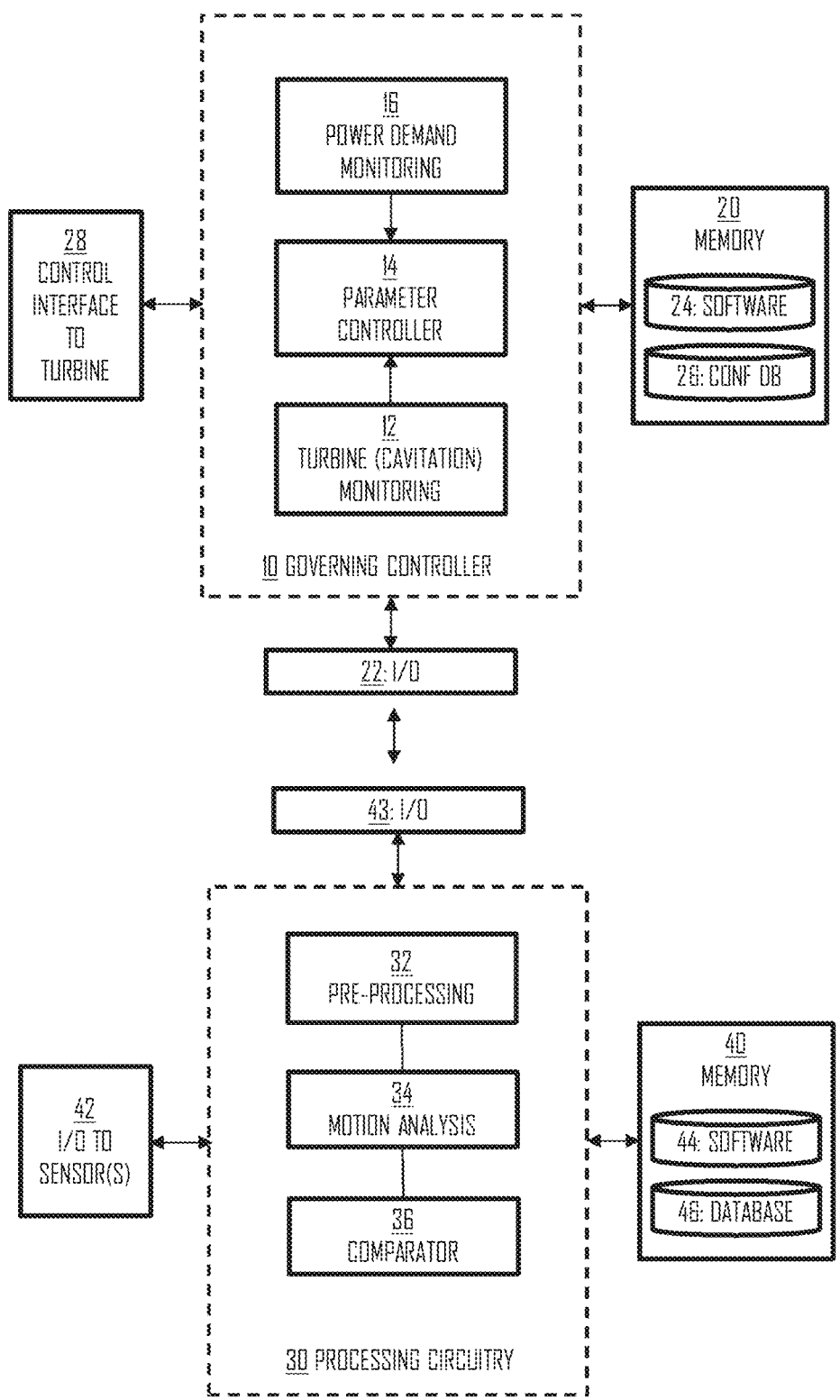
FIG. 6 illustrates a block diagram of system components according to an embodiment.

FIG. 6 illustrates an embodiment of a system comprising the processing system and the governing system. In particular, FIG. 6 illustrates a block diagram of both systems including their structural and functional components. Both the processing system and the governing system may be electronic systems comprising a set of electronic devices.

Referring to FIG. 6, the processing system may comprise an interface 42 to the one or more sensors coupled to the turbine and configured to measure the turbine, e.g. the motion of the turbine. The interface 42 may be a wireless interface or a wired interface, depending on the embodiment, and it may comprise a communication circuitry configured to support an appropriate wired or wireless communication protocol. The processing system may comprise another communication interface 43 configured to connect to the governing system via one or more computer networks. The interface 43 may comprise a communication circuitry supporting one or more computer network protocols such as an Internet protocol (IP), Ethernet protocol, transport control protocol (TCP), etc.

The processing system may further comprise a processing circuitry 30 comprising the above-described at least one processor configured to carry out at least blocks 202 to 210 or embodiments thereof. The processing circuitry 30 may comprise a pre-processing circuitry configured to pre-process the measurement data received from the sensor(s) via the interface 42. The pre-processing may comprise computing at least one of the derivatives of the measurement data, a (fast) Fourier transform of the measurement data, and/or other pre-processing functions. The processing circuitry may further comprise a motion analysis circuitry configured to compute the one or more metrics of the (pre-processed) measurement data. As described above, the metric(s) may include one or more peak values of the measurement data, the crest value, etc. The processing circuitry may further comprise a comparator configured to perform the threshold comparison between the one or more metric(s) and respective threshold(s) (block 206) and perform the corresponding output (block 208 or 210). On the basis of the comparison, the processing circuitry may update a database storing the information indicating the (un)suitability of various sets of operational parameters and/or power supply ranges, as illustrated in FIG. 4, for example.

The processing system may further comprise at least one memory 40 including a computer program code (software) 44, wherein the at least one memory and the computer program code (software) are configured, with the at least one processor, to cause the apparatus to carry out the blocks 202 to 210 or any one of its embodiments described above. The memory 40 may be implemented using any suitable data storage technology, such as semiconductor-based memory devices, flash memory, magnetic memory devices and systems, optical memory devices and systems, fixed memory and removable memory. The memory 40 may comprise the database 46 for storing the results of the analysis for various sets of operational parameters, as described above.

Referring to FIG. 6, the governing system may comprise an interface 28 to the turbine to control the turbine parameters, e.g. those described above. The interface 28 may be a wireless interface or a wired interface, depending on the embodiment, and it may comprise a communication circuitry configured to support an appropriate wired or wireless communication protocol. The governing system may comprise another communication interface 22 configured to connect to the processing system via one or more computer networks. The interface 43 may comprise a communication circuitry supporting one or more computer network protocols such as an Internet protocol (IP), Ethernet protocol, transport control protocol (TCP), etc. The interface 22 may further connect the governing system to other systems, e.g. to receive information on the power supply demand to enable the governing system to perform the power supply balancing to the grid.

The governing system may further comprise a governing controller 10 comprising at least one processor configured to select operational parameters of the turbine according to one or more inputs. The governing controller may comprise a power demand monitoring circuitry 16 configured to monitor power demand in the grid or in the power plant and output the power demand to a parameter controller 14. The governing controller may further comprise a turbine monitoring circuitry 12 configured to monitor the operation of the turbine. The turbine monitoring circuitry may monitor the efficiency of the turbine, the cavitation level on the basis of the measurement report(s) received from the processing system and indicating the (un)suitability of the current operational parameters of the turbine. In other words, the circuitry 12 may monitor various operational characteristics of the turbine and feed the results of the monitoring to the parameter controller 14. The parameter controller 14 may then select the operational parameters for the turbine on the basis of the information received from the circuitries 12, 16. The parameter controller may thus use, in addition to conventional inputs such as power demand and/or efficiency of the turbine, the information on the measured cavitation in the turbine. As described above, the measured cavitation may be employed by automated determination of power supply ranges and/or operational parameters resulting in cavitation that exceeds an acceptable level. The parameter controller may thus avoid those sets of operational parameters that result in the unacceptable level of cavitation.

The processing system may further comprise at least one memory 20 including a computer program code (software) 24, wherein the at least one memory and the computer program code (software) are configured, with the at least one processor, to cause the apparatus to carry out blocks 504 to 508, for example. The memory 20 may be implemented using any suitable data storage technology, such as semiconductor-based memory devices, flash memory, magnetic memory devices and systems, optical memory devices and systems, fixed memory and removable memory. The memory 20 may comprise a configuration database 46 defining rules for the parameter controller to select the operational parameters on the basis of the various inputs, for example.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 5 or any of the embodiments thereof may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

It will be obvious to a person skilled in the art that, as the technology advances, the inventive concept can be implemented in various ways. The invention and its embodiments are not limited to the examples described above but may vary within the scope of the claims.

What is claimed is:

1. A method for analyzing cavitation in a hydro turbine of a hydroelectric power plant, the method comprising:
   measuring, by using at least one motion sensor coupled to a rotor of the hydro turbine, motion of the rotor during operation of the hydro turbine to generate measurement data;
   acquiring, by at least one processor, the measurement data and one or more operational parameters of the hydro turbine employed during said measuring, the one or more operational parameters indicative of power supply of the hydro turbine;
   computing, by the at least one processor based on the measurement data and the operational parameters, at least one metric indicative of an effect of the cavitation on the hydro turbine;
   comparing, by the at least one processor, the at least one metric with at least one threshold and determining, based on the comparison, that the effect of the cavitation is too high; and
   outputting, by the at least one processor based on said determining, information indicating unsuitability of the one or more operational parameters,
   wherein said acquiring, computing, and comparing are performed for a plurality of different sets of one or more operational parameters and for a plurality of different power supply regions, and wherein said outputting indicates at least one suitable set of one or more operational parameters and at least one unsuitable set of one or more operational parameters.

2. The method of claim 1, wherein said information comprises an alarm signal.

3. The method of claim 1, wherein the one or more operational parameters configure the power supply to a region below 20 percent of a maximum power supply of the hydro turbine.

4. The method of claim 1, further comprising changing, by an automated governing system of the hydro turbine based on the information output by the at least one processor, at least one of the one or more operational parameters of the hydro turbine.

5. The method of claim 4, wherein the at least one of the one or more operational parameters of the hydro turbine comprises a pitch angle of rotor blades of the hydro turbine.

6. The method of claim 4, wherein the automated governing system is configured to trigger automated shut down the hydro turbine based on the information.

7. The method of claim 1, wherein the one or more operational parameters comprises at least one of output power of the hydro turbine, a flow rate of liquid through the hydro turbine, a hydrostatic pressure at the turbine, a number of revolutions per time unit of the rotor, an absolute level of the liquid at an inlet of the turbine, an absolute level of the water at an outlet of the turbine, pitch angle of rotor blades, an elevation between the inlet and the outlet of the liquid in the hydro turbine, and an operational state of the hydro turbine indicating whether the hydro turbine is running, stopped, or in state transitioning.

8. A method for analyzing cavitation in a hydro turbine of a hydroelectric power plant, the method comprising:
   measuring, by using at least one motion sensor coupled to a rotor of the hydro turbine, motion of the rotor during operation of the hydro turbine to generate measurement data;
   acquiring, by at least one processor, the measurement data and one or more operational parameters of the hydro turbine employed during said measuring, the one or more operational parameters indicative of power supply of the hydro turbine;
   computing, by the at least one processor based on the measurement data and the operational parameters, at least one metric indicative of an effect of the cavitation on the hydro turbine;
   comparing, by the at least one processor, the at least one metric with at least one threshold and determining, based on the comparison, that the effect of the cavitation is too high; and
   outputting, by the at least one processor based on said determining, information indicating unsuitability of the one or more operational parameters,
   wherein the measurement data comprises acceleration data, the method further comprising computing, by the at least one processor, at least one of a first derivative, a second derivative, and a higher derivative of the acceleration data and computing the at least one metric based on the at least one of the first derivative, second derivative, and higher derivative of the acceleration data.

9. A non-transitory computer readable medium comprising computer program instructions that configure, when read and executed by a computer, the computer to carry out a computer process corresponding to the method of claim 8.

10. A non-transitory computer readable medium comprising computer program instructions that configure, when read and executed by a computer, the computer to analyze cavitation in a hydro turbine of a hydroelectric power plant, by performing operations comprising:

measuring, by using at least one motion sensor coupled to a rotor of the hydro turbine, motion of the rotor during operation of the hydro turbine to generate measurement data;

acquiring, by at least one processor, the measurement data and one or more operational parameters of the hydro turbine employed during said measuring, the one or more operational parameters indicative of power supply of the hydro turbine;

computing, by the at least one processor based on the measurement data and the operational parameters, at least one metric indicative of an effect of the cavitation on the hydro turbine;

comparing, by the at least one processor, the at least one metric with at least one threshold and determining, based on the comparison, that the effect of the cavitation is too high; and outputting, by the at least one processor based on said determining, information indicating unsuitability of the one or more operational parameters, wherein said acquiring, computing, and comparing are performed for a plurality of different sets of one or more operational parameters and for a plurality of different power supply regions, and wherein said outputting indicates at least one suitable set of one or more operational parameters and at least one unsuitable set of one or more operational parameters.

11. The non-transitory computer readable medium of claim 10, wherein said information comprises an alarm signal.

12. The non-transitory computer readable medium of claim 10, wherein the one or more operational parameters configure the power supply to a region below 20 percent of a maximum power supply of the hydro turbine.

13. The non-transitory computer readable medium of claim 10, wherein at least one of the one or more operational parameters of the hydro turbine is changed by an automated governing system of the hydro turbine based on the information output by the at least one processor.

14. The non-transitory computer readable medium of claim 13, wherein the at least one of the one or more operational parameters of the hydro turbine comprises a pitch angle of rotor blades of the hydro turbine.

15. The non-transitory computer readable medium of claim 13, wherein the automated governing system is configured to trigger automated shut down the hydro turbine based on the information.

16. The non-transitory computer readable medium of claim 10, wherein the one or more operational parameters comprises at least one of output power of the hydro turbine, a flow rate of liquid through the hydro turbine, a hydrostatic pressure at the turbine, a number of revolutions per time unit of the rotor, an absolute level of the liquid at an inlet of the turbine, an absolute level of the water at an outlet of the turbine, pitch angle of rotor blades, an elevation between the inlet and the outlet of the liquid in the hydro turbine, and an operational state of the hydro turbine indicating whether the hydro turbine is running, stopped, or in state transitioning.

\* \* \* \* \*